United States Patent
Nii et al.

(10) Patent No.: US 9,822,259 B2
(45) Date of Patent: Nov. 21, 2017

(54) SURFACE TREATMENT COMPOSITION

(71) Applicant: DAIKIN INDUSTRIES, LTD., Osaka-shi, Osaka (JP)

(72) Inventors: Saya Nii, Settsu (JP); Kakeru Hanabusa, Cheonan-si (KR); Kensuke Mohara, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/098,372

(22) Filed: Apr. 14, 2016

(65) Prior Publication Data
US 2016/0304743 A1 Oct. 20, 2016

(30) Foreign Application Priority Data

Apr. 17, 2015 (JP) ................. 2015-085346

(51) Int. Cl.
| C08G 18/00 | (2006.01) |
| C09D 5/16 | (2006.01) |
| C08G 18/67 | (2006.01) |
| C08G 18/79 | (2006.01) |
| C08F 290/06 | (2006.01) |
| C08G 18/28 | (2006.01) |
| C09D 175/16 | (2006.01) |

(52) U.S. Cl.
CPC ........ C09D 5/1662 (2013.01); C08F 290/067 (2013.01); C08G 18/2885 (2013.01); C08G 18/673 (2013.01); C08G 18/792 (2013.01); C09D 175/16 (2013.01)

(58) Field of Classification Search
None
See application file for complete search history.

(56) References Cited

U.S. PATENT DOCUMENTS

| 6,183,872 B1 | 2/2001 | Tanaka et al. | |
| 2004/0181008 A1 | 9/2004 | Hanazawa et al. | |
| 2006/0147177 A1* | 7/2006 | Jing ........... | C08F 2/44 385/147 |
| 2006/0167200 A1* | 7/2006 | Fujimoto ........ | C08F 220/18 526/329.7 |
| 2007/0243389 A1* | 10/2007 | Audenaert ....... | C08F 283/00 428/423.1 |
| 2007/0244289 A1* | 10/2007 | Audenaert ....... | C08F 283/006 528/44 |
| 2008/0160257 A1* | 7/2008 | Takada ........ | C08J 7/04 428/145 |
| 2008/0314287 A1* | 12/2008 | Clark ........ | C07F 7/1836 106/287.11 |
| 2010/0087611 A1* | 4/2010 | Urakawa ........ | C08G 18/3853 526/261 |
| 2011/0135905 A1* | 6/2011 | Wakita ........ | C08F 283/12 428/221 |
| 2012/0107605 A1* | 5/2012 | Ozawa ........ | C08J 7/045 428/329 |
| 2013/0084458 A1* | 4/2013 | Yamada ........ | B82Y 30/00 428/421 |
| 2014/0044932 A1* | 2/2014 | Fall ........ | G03F 7/027 428/195.1 |
| 2015/0118504 A1* | 4/2015 | Ohshita ........ | C09D 7/12 428/447 |

FOREIGN PATENT DOCUMENTS

| JP | WO 2013146110 A1 * | 10/2013 | ........... C09D 7/12 |
| WO | 97/07155 A1 | 2/1997 | |
| WO | 03/002628 A1 | 1/2003 | |

* cited by examiner

Primary Examiner — Robert S Loewe
(74) Attorney, Agent, or Firm — Sughrue Mion, PLLC

(57) ABSTRACT

A composition including a compound containing a carbon-carbon double bond obtained by reacting (A) a polyisocyanate which is a trimer of diisocyanate, with (B) a compound having an active hydrogen, wherein component (B) includes (B1) a perfluoropolyether having an active hydrogen, and (B2) a monomer having an active hydrogen and at least two groups having a carbon-carbon double bond.

23 Claims, No Drawings

SURFACE TREATMENT COMPOSITION

TECHNICAL FIELD

The present invention relates to a composition comprising a perfluoropolyether compound containing a carbon-carbon double bond.

BACKGROUND ART

A certain fluorine-containing silane compound is known to be able to provide excellent water-repellency, oil-repellency, antifouling property, or the like when it is used on a surface treatment of a base material. A layer formed from the surface treatment agent comprising a fluorine-containing silane compound is applied to various base materials such as a glass, a plastic, a fiber and a building material as a so-called functional thin film.

Conventionally, in particular, in an application to an optical member, a base material formed of an inorganic glass has been used. In order to prevent adhering of a fouling such as fingerprints, a layer is formed by using a fluorine containing compound on the base material as an antifouling coating. As such fluorine containing compound, a surface treatment agent comprising a fluorine containing silane compound having a perfluoropolyether group and a hydroxyl group or a hydrolyzable group which binds to Si as an active ingredient is known (Patent Literature 1). However, in this case, since a bonding between a silanol group and a hydroxyl group are used, the base material is limited to glass, silicon, a metal oxide film, or the like.

On the other hand, recently, use of transparent plastics such as an acrylic resin, polycarbonate, and the like has been expanded as a material in place of the inorganic glass since they are lightweight, chip-proof and easily processable. It is desired to form the antifouling coating also when the resin material is used. However, since the fluorine containing silane compound as described in Patent Literature 1 is not conformable to the base material formed of the resin material, it is hard to fix on the surface of the base material. As a method of forming a layer less subjected to peeling on a surface of a base material formed of various materials such as resin, for example, Patent Literature 2 discloses a method using a composition containing a carbon-carbon double bond, which comprises (A) a triisocyanate prepared by trimerizing a diisocyanate, and (B) a combination of at least two active hydrogen-containing compounds wherein the component (B) comprises (B-1) a perfluoropolyether having at least one active hydrogen, and (B-2) a monomer having an active hydrogen and a carbon-carbon double bond.

PRIOR ART LITERATURE

Patent Literature

Patent Literature 1: WO 97/07155 A
Patent Literature 2: WO 2003-002628 A

SUMMARY OF THE INVENTION

Problem to be Solved by the Invention

Recently, under a circumstance where a smartphone and a tablet terminal spread rapidly, with respect to use of a touch panel, it is desired to provide durability capable of maintaining slip property (specifically, friction durability) for a long time. However, the conventional composition cannot necessarily satisfy the increased requirements described above.

Therefore, an object of the present invention is to provide a composition useful for forming a layer having excellent friction durability in addition to water-repellency, oil-repellency and antifouling property on a base material consisting of various materials comprising a resin and a surface treatment agent comprising the composition.

Means to Solve the Problem

As a result of intensively studying, the inventors of the present invention have found that in the composition of Patent Literature 2, by using a monomer comprising a plurality of groups having a carbon-carbon double bond as component (B-2), a layer having excellent friction durability in addition to water-repellency, oil-repellency and antifouling property can be formed on a surface of a base material, and the inventors complete the present invention.

Therefore, according to the first aspect of the present invention, there is provided a composition comprising a compound containing a carbon-carbon double bond obtained by reacting (A) a polyisocyanate which is a trimer of diisocyanate, with
(B) a compound having an active hydrogen,
wherein
component (B) comprises:
(B1) a perfluoropolyether having an active hydrogen, and
(B2) a monomer having an active hydrogen and at least two groups having a carbon-carbon double bond.

According to the second aspect of the present invention, there is provided a surface treatment composition comprising one or more compositions described above.

According to the third aspect of the present invention, there is provided a curable composition comprising one or more compositions described above or one or more surface treatment compositions described above; and a matrix forming composition.

According to the fourth aspect of the present invention, there is provided an article comprising a base material and a layer which is formed on a surface of the base material from the surface treatment composition described above or the curable composition described above.

Effect of the Invention

According to the present invention, by reacting (A) a polyisocyanate which is a trimer of diisocyanate with (B1) a perfluoropolyether having an active hydrogen and (B2) a monomer having at least two groups having a carbon-carbon double bond and an active hydrogen, a composition can be provided which is able to form a layer (hereinafter, referred to as a "surface treating layer") having water-repellency, oil-repellency and antifouling property as well as excellent friction durability.

EMBODIMENTS TO CARRY OUT THE INVENTION

Hereinafter, the composition of the present invention will be described.

The composition of the present invention is preferably used in a treatment of a surface of a base material formed of various materials including a resin. That is, the composition of the present invention is used as a surface treatment composition.

According to the present invention, by reacting component (A) with component (B), i.e., by reacting an isocyanate group (a —NCO group) present in component (A) with an active hydrogen containing group, for example a hydroxy group, present in (B1) a perfluoropolyether having an active hydrogen and (B2) a monomer having an active hydrogen and at least two groups a carbon-carbon double bond, a composition comprising a compound having a group having a carbon-carbon double bond and a perfluoropolyether group (hereinafter, also referred to as "a compound containing a carbon-carbon double bond") can be obtained.

As used herein, the "active hydrogen" represents a hydrogen atom which can be donated as a proton to an isocyanate group. The "active hydrogen containing group" represents a group containing the active hydrogen described above, and includes, for example, a —OH group, a —C(=O)H group, a —SH group, a —SO$_3$H group, a —SO$_2$H group, a —SOH group, a —NH$_2$ group, a —NH— group, a —SiH group, and the like.

Component (A) is a polyisocyanate which can be obtained by trimerizing a diisocyanate. The polyisocyanate which is a trimer of diisocyanate may exist as a polymer thereof.

In a preferable embodiment, the polyisocyanate which is a trimer of diisocyanate as component (A) may be an isocyanurate type polyisocyanate. The isocyanurate type polyisocyanate may exist as a polymer thereof. That is, the isocyanurate type polyisocyanate is a monocyclic compound having only one isocyanurate ring, or a polycyclic compound which is obtained by polymerization of the monocyclic compound, or a mixture thereof. The isocyanurate type polyisocyanate is commercially available, for example, as SUMIDUR (registered trademark) N3300 (manufactured by Sumitomo Bayer Urethane Co., Ltd.).

Examples of the diisocyanate which is used for preparing the above (A) polyisocyanate which is a trimer of diisocyanate include, but are not particularly limited to, a diisocyanate in which an isocyanate group is bonded to an aliphatic group, for example, hexamethylene diisocyanate, isophorone diisocyanate, xylylene diisocyanate, hydrogenated xylylene diisocyanate, dicyclohexylmethane diisocyanate; a diisocyanate in which an isocyanate group is bonded to an aromatic group, for example, tolylene diisocyanate, diphenylmethane diisocyanate, polymethylenepolyphenyl polyisocyanate, tolidine diisocyanate, and naphthalene diisocyanate.

Examples of the specific polyisocyanate which is a trimer of diisocyanate as component (A) include, but are not particularly limited to, a compound of the following formula:

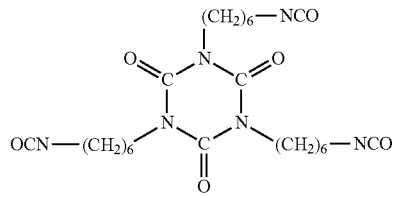

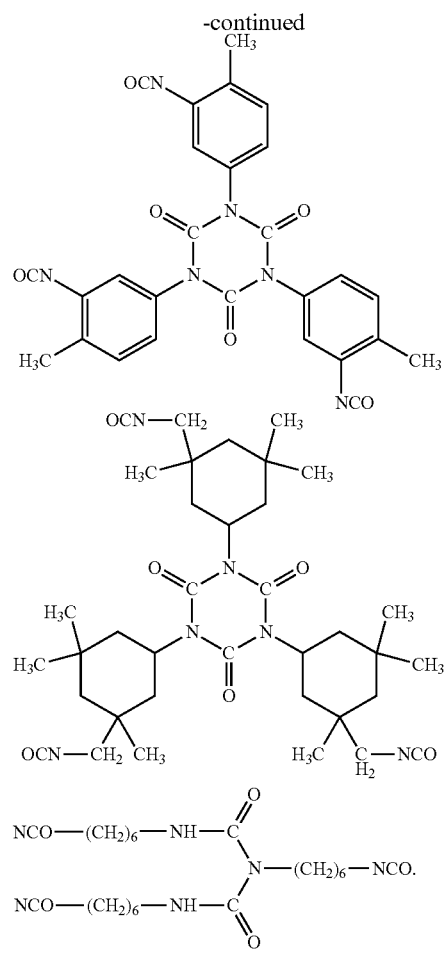

As mentioned above, these polyisocyanate may exist as a polymer, for example, when the polymer is an isocyanurate type polyisocyanate of hexamethylene diisocyanate, it may exist as a polymer of the following structure:

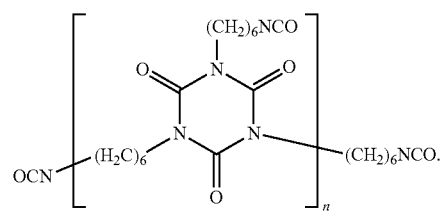

Component (B) comprises the following two components:
(B1) a perfluoropolyether having an active hydrogen, and
(B2) a monomer having at least two group having a carbon-carbon double bond and an active hydrogen.

The perfluoropolyether having an active hydrogen in component (B1) is a compound having one active hydrogen containing group, for example a hydroxy group, at one terminal of the molecular chain or having one active hydrogen containing group, for example, a hydroxy group, at each of two terminals of the molecular chain, in addition to the perfluoropolyether group.

The perfluoropolyether having an active hydrogen in component (B1) has a number average molecular weight of 500-12,000, preferably 1,000-10,000, more preferably 1,500-8,000, but not particularly limited thereto.

The perfluoropolyether having an active hydrogen may be at least one compound of any one of the following formulae (B1-a) and (B1-b):

$$Rf\text{—}PFPE\text{-}Z\text{—}X \quad (B1\text{-}a)$$

$$X\text{—}Z\text{—}PFPE\text{-}Z\text{—}X \quad (B1\text{-}b).$$

In the formulae (B1-a) and (B1-b), Rf represents an alkyl group (for example, straight or branched) having 1-16 carbon atoms which may be substituted by one or more fluorine atoms, preferably a straight or branched alkyl group having 1-3 carbon atoms which may be substituted by one or more fluorine. Preferably, Rf is straight. Preferably, the alkyl group which may be substituted by one or more fluorine is a fluoroalkyl group in which a terminal carbon atom is $CF_2H$—, and the other carbon atoms are fully substituted by a fluorine atom or a perfluoroalkyl group, more preferably a perfluoroalkyl group, specifically —$CF_3$, —$CF_2CF_3$ or —$CF_2CF_2CF_3$.

In the formulae (B1-a) and (B1-b), PFPE is a group of the following formula:

$$\text{—}(OC_4F_8)_a\text{—}(OC_3F_6)_b\text{—}(OC_2F_4)_c\text{—}(OCF_2)_d\text{—}.$$

In the formula, a, b, c and d represent the repeating number of each of four repeating units of perfluoropolyether, and are each independently an integer of an integer of 0-200, for example an integer of 1-200, and the sum of a, b, c and d is at least one, preferably 5-300, more preferably 10-200, further preferably 10-100. The occurrence order of the respective repeating units in parentheses with the subscript a, b, c or d is not limited in the formula. Among these repeating units, the —($OC_4F_8$)— group may be —($OCF_2CF_2CF_2CF_2$)—, —($OCF(CF_3)CF_2CF_2$)—, ($OCF_2CF(CF_3)CF_2$)—, —($OCF_2CF_2CF(CF_3)$)—, —(OC($CF_3$)$_2$$CF_2$)—, ($OCF_2C(CF_3)_2$)— and —($OCF(CF_3)CF(CF_3)$)—, preferably —($OCF_2CF_2CF_2CF_2$)—. The —($OC_3F_6$)— group may be ($OCF_2CF_2CF_2$)—, —($OCF(CF_3)CF_2$)— and —($OCF_2CF(CF_3)$)—, preferably —($OCF_2CF_2CF_2$)—. The —($OC_2F_4$)— group may be —($OCF_2CF_2$)— and —($OCF(CF_3)$)—, preferably —($OCF_2CF_2$)—.

The compound comprising the perfluoropolyether group can exert excellent water-repellency, oil-repellency and antifouling property (for example, preventing from adhering a fouling such as fingerprints).

In a preferable embodiment, the PFPE is a group of any one of the formulae (i)-(iv):

$$\text{—}(OCF_2CF_2CF_2)_b\text{—} \quad (i)$$

wherein b is an integer of 1-200, $$\text{—}(OCF(CF_3)CF_2)_b\text{—} \quad (ii)$$

wherein b is an integer of 1-200, $$\text{—}(OCF_2CF_2CF_2CF_2)_a\text{—}(OCF_2CF_2CF_2)_b\text{—}(OCF_2CF_2)_c\text{—}(OCF_2)_d\text{—} \quad (iii)$$

wherein a and b are each independently 0 or an integer of 1-30, c and d are each independently an integer of 1-200, and the occurrence order of the respective repeating units in parentheses with the subscript a, b, c or d is not limited in the formula, or $$\text{—}(OC_2F_4\text{—}R^5)_i\text{—} \quad (iv)$$

wherein $R^5$ is a group selected from $OC_2F_4$, $OC_3F_6$ and $OC_4F_8$; and i is an integer of 2-100.

In the formulae (B1-a) and (B1-b), Z is each independently a divalent organic group.

Z is preferably $R^1$, $R^1$ is each independently a group of the following formula:

$$\text{—}(Y)_f\text{—}(CR^3_2)_j\text{—}.$$

In the formula, Y is a divalent polar group. Examples of the divalent polar group include, but are not particularly limited to, —COO—, —OCO—, —CONH—, —OCH$_2$CH(OH)CH$_2$—, —CH$_2$CH(OH)CH$_2$O—, —COS—, —SCO—, and —O—, preferably it is —COO—, —CONH—, —CH$_2$CH(OH)CH$_2$O— or —O—.

In the formula, $R^3$ is, each independently at each occurrence, a hydrogen atom or a fluorine atom.

In the formula, f is an integer of 0-50, preferably 0-20, for example 1-20. j is an integer of 0-100, preferably 0-40, for example an integer of 1-40. The sum of f and j is at least one. The occurrence order of the respective repeating units in parentheses with the subscript f or j is not limited in the formula.

Preferably, $R^1$ is each independently a group of the following formula:

$$\text{—}(Y)_f\text{—}(CF_2)_g\text{—}(CH_2)_h\text{—}.$$

In the formula, Y and f are as defined above, g and h are each independently an integer of 0-50, preferably 0-20, for example an integer of 1-20. The sum of f, g and h is at least one, preferably 1-10. Further preferably, f, g and h are an integer of 0-2, yet preferably f is 0 or 1, g is 2, and h is 0 or 1. The occurrence order of the respective repeating units in parentheses with the subscript f, g or h is not limited in the formula.

In the formula, X is an active hydrogen containing group. X is, preferably, each independently a —OH group, a —C(=O)H group, a —SH group, a —SO$_3$H group, a —SO$_2$H group, a —SOH group, a —NH$_2$ group, a —NH— group or a —SiH group, more preferably the —OH group or the —NH$_2$ group, further preferably the —OH group.

Preferably, the perfluoropolyether having an active hydrogen is at least one compound of any one of the general formulae (B1-i) and (B1-ii):

$$Rf\text{—}PFPE^1\text{-}Z\text{—}X \quad (B1\text{-}i)$$

$$X\text{—}Z\text{—}PFPE^2\text{-}Z\text{—}X \quad (B1\text{-}ii).$$

By using such compound, slip property and alcohol-repellency of an obtained surface treating layer are increased.

In the formula, Rf, Z and X are as defined in the formulae (B1-a) and (B1-b).

In the formula, $PFPE^1$ is a formula:

$$\text{—}(OCF_2CF_2CF_2)_b\text{—}$$

wherein b is an integer of 1 or more and 200 or less, preferably an integer of 5 or more and 200 or less, more preferably 10 or more and 200 or less, $$(OCF_2CF_2CF_2CF_2)_a\text{—}(OCF_2CF_2CF_2)_b\text{—}(OCF_2CF_2)_c\text{—}(OCF_2)_d\text{—}$$

wherein a and b are each independently an integer of 0 or more and 30 or less, c and d is each independently an integer of 1 or more and 200 or less, preferably an integer of 5 or more and 200 or less, more preferably an integer of 10 or more and 200 or less, and the occurrence order of the respective repeating units in parentheses with the subscript a, b, c or d is not limited in the formula, or $$\text{—}(OC_2F_4\text{—}R^5)_i\text{—}$$

wherein $R^5$ is a group selected from $OC_2F_4$, $OC_3F_6$ and $OC_4F_8$;

i is an integer of 2 or more and 100 or less, preferably an integer of 2 or more and 50 or less.

Preferably, PFPE$^1$ is —(OCF$_2$CF$_2$CF$_2$)$_b$—.

In the formula, PFPE$^2$ is a group of the formula:

—(OCF$_2$CF$_2$CF$_2$)$_b$— wherein b is an integer of 1 or more and 200 or less, preferably an integer of 5 or more and 200 or less, more preferably 10 or more and 200 or less.

or

—(OC$_2$F$_4$—R$^5$)$_i$— wherein $R^5$ is a group selected from $OC_2F_4$, $OC_3F_6$ and $OC_4F_8$; and i is an integer of 2 or more and 100 or less, preferably an integer of 2 or more and 50 or less.

Preferably, PFPE$^2$ is —(OCF$_2$CF$_2$CF$_2$)$_b$—.

In an preferable embodiment, component (B1) may be at least one compound of any one of the following general formulae (B1-i') and (B1-ii'):

Rf—PFPE$^1$-R$^1$—CH$_2$OH  (B1-i')

HOCH$_2$—R$^1$—PFPE$^2$-R$^1$—CH$_2$OH  (B1-ii')

wherein Rf, PFPE$^1$, PFPE$^2$ and R$^1$ are as defined above.

In a more preferable embodiment, in component (B1) is a compound of the formula (B1-i):

Rf—PFPE$^1$-R$^1$—CH$_2$OH  (B1-i)

wherein Rf and R$^1$ are as defined above;

PFPE$^1$ is —(OCF$_2$CF$_2$CF$_2$)$_b$—, and b is an integer of 1 or more and 200 or less.

When component (B1) is the compound of the formula (B1-i), friction durability is more increased.

In one embodiment, component (B1), PFPE$^1$ is —(OCF$_2$CF$_2$CF$_2$)$_b$— or —(OC$_2$F$_4$—R$^5$)$_i$—, preferably —(OCF$_2$CF$_2$CF$_2$)$_b$—. By setting PFPE$^1$ to the above group, alcohol-repellency is more increased.

The monomer having at least two groups having a carbon-carbon double bond and an active hydrogen in component (B2) has at least one, preferably one active hydrogen containing group, preferably hydroxy group at its molecular terminal.

In a preferable embodiment, component (B2) has at least three carbon-carbon double bonds. For example, component (B2) may have at least 4, or at least 5 carbon-carbon double bonds.

In a preferable embodiment, the monomer having at least two groups having a carbon-carbon double bond and an active hydrogen in component (B2) has the following group:

—OC(O)—CR$^2$=CH$_2$ as the group having a carbon-carbon double bond.

In the formula, R$^2$ is a hydrogen atom, a chlorine atom, a fluorine atom, or an alkyl group having 1-10 carbon atoms which may be substituted by a fluorine atom, preferably a hydrogen atom or an alkyl group having 1-3 carbon atoms, more preferably a hydrogen atom or a methyl group. The group wherein R$^2$ is a hydrogen atom or a methyl group, i.e. —OC(O)—CH=CH$_2$ or —OC(O)—CCH$_3$=CH$_2$ is also collectively referred to as "(meth)acrylate group" herein.

In a preferable embodiment, component (B2) is at least one compound selected from the group consisting of:

HO—CH$_2$—C(CH$_2$—OC(O)—CR$^2$=CH$_2$)$_3$;

HO—CH$_2$—C(CH$_2$—OC(O)—CR$^2$=CH$_2$)$_2$—CH$_2$OCH$_2$—C(CH$_2$—OC(O)—CR$^2$=CH$_2$)$_3$;

HO—CH(CH$_2$—OC(O)—CR$^2$=CH$_2$)$_2$;

HO—Y$^1_p$—CH$_2$CH$_2$-Q(CH$_2$CH$_2$O—X$_p$—CO—CR$^2$=CH$_2$)$_2$;

HO—Y$^2_p$—CH$_2$—C(CH$_2$O—Y$^2_p$—CO—CR$^2$=CH$_2$)$_3$; or

HO—Y$^2_p$—CH$_2$—C(CH$_2$—O—Y$^2_p$—C(O)—CR$^2$=CH$_2$)$_2$—CH$_2$OCH$_2$—C(CH$_2$—O—Y$^2_p$—C(O)—CR$^2$=CH$_2$)$_3$ wherein R$^2$ is as defined above, Q is a group of the formula:

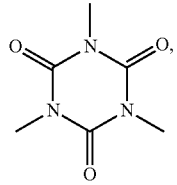

Y$^1$ is —CO—(CH$_2$)$_5$—O—;

Y$^2$ is each independently —CH$_2$CH$_2$O— or —CH$_2$CH(CH$_3$)O—; and p is each independently an integer of 0-2, preferably 0 or 1.

Component (B2) is specifically at least one compound selected from the group consisting of pentaerythritol triacrylate, dipentaerythritol pentaacrylate, 2-hydroxy-3-methacrylpropylacrylate, 2-hydroxyethyl bis(2-acryloxyethyl) isocyanurate, caprolatone modified2-hydroxyethyl bis(2-acryloxyethyl)isocyanurate, ethoxylated pentaerythritol triacrylate, propoxylated pentaerythritol triacrylate, ethoxylated dipentaerythritol pentaacrylate, propoxylated dipentaerythritol pentaacrylate, ethoxylated pentaerythritol trimethacrylate, propoxylated pentaerythritol trimethacrylate, ethoxylated dipentaerythritol pentaacrylate, and propoxylated dipentaerythritol pentaacrylate.

In a more preferable embodiment, component (B2) is at least one compound selected from the group consisting of pentaerythritol triacrylate and dipentaerythritol pentaacrylate.

In one embodiment, component (B) consists of component (B1) and component (B2).

In a preferable embodiment, component (B1) is

Rf—(OCF$_2$CF$_2$CF$_2$)$_b$—Z—X wherein Rf, Z, X and b are as defined above, and component (B2) is pentaerythritol triacrylate.

The compound containing a carbon-carbon double bond contained in the composition of the present invention may have groups each of which is derived from different component (B1) in one molecule of triisocyanate. In addition, it may have different groups (for example, having different number of carbon-carbon double bonds) derived from component (B2) in one molecule of triisocyanate.

The composition of the present invention may contain one or 2 or more compounds containing a carbon-carbon double bond. For example, the composition of the present invention may be a mixture of a compound obtained by reacting component (A) with compound B1 as component (B1) and compound B2 as component (B2), and a compound obtained by reacting component (A) with compound B1' as component (B1) and compound B2' as component (B2). These compounds may be simultaneously synthesized, or may be separately synthesized, and then be mixed.

The composition of the present invention can form a layer having more excellent friction durability in addition to water-repellency, oil-repellency and antifouling property on a base material formed of various material including a resin by having two or more groups having a carbon-carbon double bond. In addition, the composition of the present invention can have improved solubility in a solvent. Furthermore, the composition of the present invention has excellent alcohol-repellency.

In one embodiment, component (B3) may contain further component (B3): a silane compound having an active hydrogen.

The silane compound having an active hydrogen in component (B3) is a compound having one active hydrogen containing group, for example a hydroxy group, at one terminal of the molecular chain or having one active hydrogen containing group, for example, a hydroxy group, at each of two terminals of the molecular chain.

The silane compound having an active hydrogen in component (B3) has a number average molecular weight of 100-20,000, preferably 500-15,000, more preferably 800-12,000, but not particularly limited thereto.

Preferably, component (B3) is at least one compound of the following general formula (B3-i):

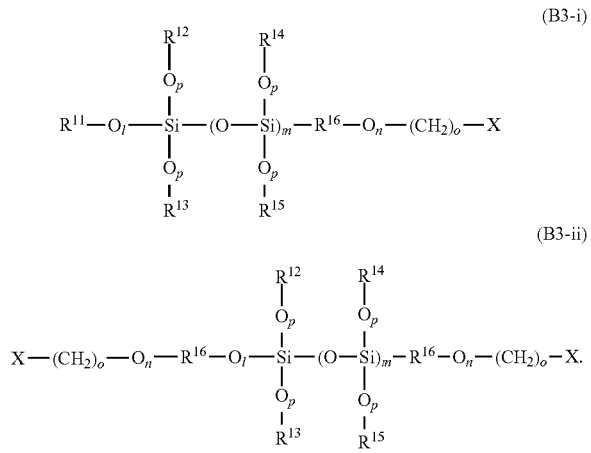

In the formulae (B3-i) and (B3-ii), $R^{11}$, $R^{12}$, $R^{13}$, $R^{14}$ and $R^{15}$ are each independently an alkyl group or an aryl group.

Examples of the alkyl group include, but are not particularly limited to, an alkyl group having 1-10 carbon atoms, and a cycloalkyl group having 3-20 carbon atoms, preferably an alkyl group having 1-6 carbon atoms. The alkyl group may be straight or branched, preferably straight. A preferable example is, for $R^{11}$, an n-butyl group, and for $R^{12}$-$R^{15}$, a methyl group.

Examples of the aryl group include, but are not particularly limited to, an aryl group having 6-20 carbon atoms. The aryl group may contain 2 or more rings. Preferable aryl group is a phenyl group.

The alkyl group and the aryl group may optionally contain a heteroatom, for example, a nitrogen atom, an oxygen atom or a sulfur atom in its molecular chain or ring.

Furthermore, the alkyl group and the aryl group may be optionally substituted by one or more substituents selected from a halogen; a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl, which may be substituted by one or more halogens.

In the formulae (B3-i) and (B3-ii), $R^{16}$ represents a divalent organic group. Preferably, $R^{16}$ is $-(CH_2)_r-$ wherein r is an integer of 1-20, preferably an integer of 1-10.

In the formulae (B3-i) and (B3-ii), X is an active hydrogen containing group. The X group is preferably, a $-OH$ group, a $-C(=O)H$ group, a $-SH$ group, a $-SO_3H$ group, a $-SO_2H$ group, a $-SOH$ group, a $-NH_2$ group, a $-NH-$ group or a $-SiH$ group, more preferably the $-OH$ group or the $-NH_2$ group, further preferably the $-OH$ group.

In the formulae (B3-i) and (B3-ii), l and n are each independently 0 or 1; m is an integer of 1-500, preferably an integer of 1-200, more preferably 5-150; o is an integer of 0-20, for example, an integer of 1-20, and p is 0 or 1.

Examples of the specific compound of the formula (B3-i) include for example a compound of the formula:

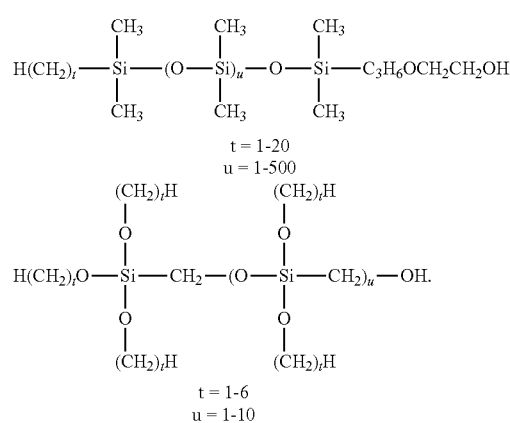

Component (B3) may be a silane compound having an amino group as an active hydrogen containing group. Example of such compound includes, but is not particularly to, a compound of the following formula:

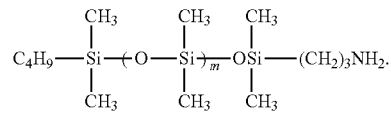

A ratio of an number average molecular weight of component (B1) to component (B3) is, but not particularly limited to, for example, 1:5-5:1, preferably 1:3-3:1, more preferably 1:3-3:2. By setting the ratio of the number average molecular weight of component (B1) to component (B3) to the above range, solubility in a fluorine-free solvent is increased.

In a reaction of component (A) with component (B) in the present invention, the isocyanate group of component (A) and the hydroxy group of component (B) are reacted to form an urethane bond.

A method of the reaction of component (A) with components (B1) and (B2) is not particularly limited. For example, component (A) and components (B1) and (B2) may be simultaneously reacted, or component (A) and components (B1) and (B2) may be sequentially reacted.

A solvent used in this reaction is not particularly limited as long as the reaction can proceed. Various fluorine solvents, various general-purpose solvents, or a mixture thereof at any ratio can be used, preferably, 1,1-dichloro-1,2,2,3,3-pentafluoropropane (HCFC 225) is used.

When component (83) is present, a method of the reaction of component (A) with components. (B1)-(B3) is not particularly limited. For example, the reaction may be performed in one system (i.e., one-pot synthesis) or the respective reaction may be performed in each of two systems.

When the one-pot synthesis is performed, for example, by adding components (B1)-(B3) into component (A) simultaneously, they may be simultaneously reacted; or by sequentially adding components (B1)-(B3), they may be sequentially reacted. When they are sequentially added (reacted), the order of adding (reacting) is not particularly limited. For example, components (B1)-(B3) may be separately added and reacted in any order, or two components of components (B1)-(B3) may be simultaneously added and reacted, and then the other component may be added and reacted. Preferably, components (B1) and (B3) may be added and reacted, and then component (B2) may be added and reacted, or component (B1) may be added and reacted, and then component (B3) may be added and reacted, finally, component (B2) may be added and reacted. When they are sequentially added, the component added finally may be used in an excessive amount.

A solvent used in this reaction is not particularly limited as long as the reaction can proceed. Various fluorine solvents, various general-purpose solvent, or a mixture thereof at any ratio can be used, preferably, 1,1-dichloro-1,2,2,3,3-pentafluoropropane (HCFC 225) is used.

By performing the synthesis in the one-pot system, a process can be simplified, for example, purification in each step can be omitted.

When the reaction is performed in two systems, for example, in one system, component (A) and components (B1) and (B2) may be reacted to obtain the first composition. In the other system, component (A) and components (B2) and (B3) may be reacted to obtain the second composition. Then, the obtained first composition and the obtained second composition may be mixed to obtain the composition of the present invention. It is noted that in the composition of the present invention thus obtained, the compound containing a carbon-carbon double bond having both the perfluoropolyether derived from component (B1) and the silane part derived from component (B3) may be substantially absent. In addition, the order of the reaction in each system is not particularly limited. For example, component (A) and components (B1) (or component (B3)) and (B2) may be simultaneously reacted, or component (A) and component (B1) (or component (B3)) may be reacted, and then component (B2) may be reacted, or the reverse order is acceptable. It is preferable that component (A) and component (B1) (or component (B3)) are reacted, and then component (B2) is reacted.

As mentioned above, by performing the reaction of component (A) with component (B1) and the reaction of component (A) with component (B3) in a separate system from each other, for each reaction, a more suitable condition such as a solvent can be selected. If for each reaction, the suitable condition can be selected, variation in the products can be suppressed in comparison with the one-pot synthesis, in particular, in a large scale synthesis. In detail, generally, component (B1) is soluble in a fluorine solvent and is poor-soluble in a general-purpose solvent, while component (B3) is soluble in a general-purpose solvent and is poor-soluble in a fluorine solvent. When the synthesis is performed in the one-pot system, in particular, when the synthesis is performed in a large scale, influence due to the difference of the solubility become remarkable. Any one of component (B1) or component (B3) is not completely dissolved and it becomes difficult to stably control the reaction (in other words, to perform the reaction with high repeatability). On the other hand, when the reaction is performed in two systems, since the most suitable solvent can be selected for each reaction, it becomes easy to stably control the reaction. In other words, the reaction can be performed with high repeatability, thus, it becomes easy to suppress variation in the obtained products.

Examples of the solvent used in the reaction of component (A) with component (B1) include, but are not particularly limited to, a fluorine solvent (for example, HCFC 225, ZEORORA (registered trademark) H or the like), preferably, HCFC 225 or ZEORORA H, more preferably ZEORORA H.

Examples of the solvent used in the reaction of component (A) with component (B3) include, but are not particularly limited to as long as component (A) and component (B3) are successfully dissolved and the reaction proceeds, for example, dimethoxy ethane, methyl isobutyl ketone (MIBK), acetone, and the like. More preferably, methyl ethyl ketone is used.

It is noted that a solvent contained in the composition of the present invention obtained by mixing the first composition and the second composition thus obtained are not necessarily the solvent described above, and may be another solvent, for example, a fluorine-containing organic solvent or a fluorine-free organic solvent described below.

The obtained compound containing a carbon-carbon double bond may be a mixture of different type of compounds obtained by reacting an isocyanate group in the polyisocyanate molecule which is a trimer of diisocyanate in component (A) with any component selected from the group consisting of component (B2) and component (B3) in component (B1).

The composition of the present invention may further comprise at least one fluorine-containing oil of the following general formula (C).

$$Rf^1\text{—PFPE-}Rf^2 \qquad (C)$$

In the formula (C), $Rf^1$ represents an alkyl having 1-16 carbon atoms which may be substituted by one or more fluorine atoms, and $Rf^2$ represents a hydrogen atom, a fluorine atom, or an alkyl having 1-16 carbon atoms which may be substituted by one or more fluorine atoms. Preferably, the alkyl which may be substituted by one or more fluorine atoms is a fluoroalkyl group in which a terminal carbon atom is $CF_2H$—, and the other carbon atoms are fully substituted by a fluorine atom or a perfluoroalkyl group, more preferably a perfluoroalkyl group. More preferably, $Rf^1$ and $Rf^2$ are each independently a perfluoroalkyl group having 1-3 carbon atoms.

In the formula (C), PFPE is a group of the following general formula:

$$-(OC_4F_8)_{a'}-(OC_3F_6)_{b'}-(OC_2F_4)_{c'}-(OCF_2)_{d'}-$$

wherein a', b', c' and d' represent the repeating number of each of four repeating units of perfluoropolyether, and are each independently an integer of 0-300, preferably an integer of 0-200, for example an integer of 1-200, and the sum of a', b', c' and d' is at least 1, preferably 1-300. The occurrence order of the respective repeating units in parentheses with the subscript a', b', c' or d' is not limited in the formulae. Among these repeating units, the —(OC$_4$F$_8$)— group may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, preferably —(OCF$_2$CF$_2$CF$_2$CF$_2$)—. The —(OC$_3$F$_6$)— group may be any of —(OCF$_2$CF$_2$CF$_2$)—, (OCF(CF$_3$)CF$_2$)— and —(OCF$_2$CF(CF$_3$))—, preferably (OCF$_2$CF CF$_2$)—. The —(OC$_2$F$_4$)— group may be any of (OCF$_2$CF$_2$)— and —(OCF(CF$_3$))—, preferably —(OCF$_2$CF$_2$)—.

In a preferable embodiment, the fluorine-containing oil (C) is at least one compound of any one of the following formulae (C1)-(C4):

  (C1)

wherein Rf$^1$ and Rf$^2$ are as defined in the formula (C); and b' is an integer of 1-300,

  (C2)

wherein Rf$^1$ and Rf$^2$ are as defined in the formula (C); and b' is an integer of 1-300, and

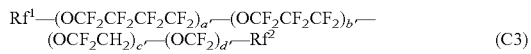  (C3)

wherein Rf$^1$ and Rf$^2$ are as defined in the formula (C);
a' and b' are each independently 0 or an integer of 1-30, c' and d' are each independently an integer of 1-300, and the occurrence order of the respective repeating units in parentheses with the subscript a', b', c' or d' is not limited in the formula,
or

  (C4)

wherein Rf$^1$ and Rf$^2$ are as defined in the formula (C);
R$^{5'}$ is a group selected from OC$_2$F$_4$, OC$_3$F$_6$ and OC$_4$F$_8$; and
i is an integer of 2-100.

The above-mentioned fluorine-containing oil (C) may have an average molecular weight of 1,000-30,000. By having such average molecular weight, high surface slip property can be obtained. Representatively, a compound of any one of the general formulae (C1)-(C4) has preferably an average molecular weight of about 1,500 or more. In such range of the average molecular weight, high surface slip property can be obtained.

The fluorine-containing oil (C) may be contained in the composition of the present invention, for example, at 0-80 parts by mass, preferably 0-40 parts by mass with respect to the total 100 parts by mass of the composition obtained by reacting component (A) with component (B).

The composition of the present invention may contain other components, for example, a silicone oil, an active energy curing initiator, and the like in addition to the above component.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the composition of the present invention, for example, at 0-50 parts by mass, preferably 0-10 parts by mass with respect to the total 100 parts by mass of the composition obtained by reacting component (A) with component (B).

As the active energy curing initiator, for example, a compound is used which generates a radical or cation only by irradiation of an electromagnetic wave of 350 nm or less, that is, an ultraviolet light, an electron beam, an X-ray, a γ-ray, etc., and functions as a catalyst initiating curing (cross-linking reaction) of a curable moiety (for example, carbon-carbon double bond) in the compound of the composition, usually a compound which generates a radical or cation, in particular a radical by irradiation of ultraviolet.

The active energy curing initiator in the composition of the present invention can be appropriately selected depending on a type of the component (B2) having a carbon-carbon double bond, a type or irradiation intensity of an active energy ray used (range of wavelength, etc.). When the general active energy curing initiator is used, examples of the initiator include, for example, the following compounds.

Acetophenones
acetophenone, chloroacetophenone, diethoxyacetophenone, hydroxyacetophenone, α-aminoacetophenone, hydroxypropiophenone, 2-methyl-1-[4-(methylthio)phenyl]-2-morpholinopropan-1-one, and the like.

Benzoins
benzoin, benzoin methyl ether, benzoin ethyl ether, benzoin isopropyl ether, benzoin isobutyl ether, benzyl dimethyl ketal, and the like.

Benzophenones
benzophenone, benzoyl benzoate, methyl benzoyl benzoate, 4-phenyl benzophenone, hydroxy benzophenone, hydroxy-propyl benzophenone, acrylated benzophenone, Michler's ketone, and the like.

Thioxanthones
thioxanthone, chlorothioxanthone, methylthioxanthone, diethylthioxanthone, dimethylthioxanthone, and the like.

Others
benzyl, α-acyloxime ester, acylphosphine oxide, glyoxy ester, 3-ketocoumarin, 2-ethylanthraquinone, camphorquinone, anthraquinone, and the like.

These active energy curing initiators may be used alone or may be used in combination of two or more.

The active energy curing initiator is contained at 0.01-30 parts by mass, preferably 0.1-20 parts by mass with respect to the total 100 parts by mass of the compound obtained by reacting component (A) with component (B), and if present, the fluorine-containing oil (C), but are not particularly limited thereto.

The composition of the present invention may contain a solvent. The composition of the present invention has high solubility in a solvent, and can be dissolved in a fluorine-containing organic solvent and a fluorine-free organic solvent. Examples of the preferable solvent include, for example, a fluorine-containing organic solvent.

Examples of the fluorine-containing organic solvent include, for example, perfluorohexane, perfluorooctane, perfluoro-dimethyl cyclohexane, perfluorodecalin, perfluoroalkyl ethanol, perfluorobenzene, perfluorotoluene, perfluoroalkylamines (Fluorinert (trade name), etc.), perfluoroalkyl ethers, perfluorobutyl tetrahydrofuran, polyfluoro-aliphatic hydrocarbons (ASAHIKLIN AC6000 (trade name)), hydrochlorofluorocarbons (ASAHIKLIN AK-225 (trade name), etc.), hydrofluoroethers (Novec (trade name), HFE-7100 (trade name), etc.), 1,1,2,2,3,3,4-heptafluorocyclopentane ((ZEORORA H (trade name), etc.), fluorine-containing alcohols, perfluoroalkyl bromide, perfluoroalkyl iodide, perfluoropolyether (Krytox (trade name), Demnum (trade name), Fomblin (trade name), etc.), 1,3-bistrifluoromethyl benzene, 2-(perfluoroalkyl)ethyl methacrylate, 2-(perfluoroalkyl) ethyl acrylate, perfluoroalkyl ethylene, Freon 134a, and hexafluoropropene oligomers. The fluorine-containing organic solvent is preferably hydrochlorofluorocarbons (ASAHIKLIN AK-225 (trade name)).

These solvents may be used alone or may be used in combination of two or more.

In another preferable embodiment, the solvent may be a mixed solvent of a fluorine-containing organic solvent and a fluorine-free organic solvent.

Examples of the fluorine-free organic solvent include, for example, acetone, methyl ethyl ketone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, acetonitrile, benzonitrile, butanol, 1-propanol, 2-propanol, ethanol, methanol, and diacetone alcohol. The fluorine-free organic solvent is preferably methyl ethyl ketone, methyl isobutyl ketone, ethyl acetate or butyl acetate.

Preferably, the mixed solvent used in the composition of the present invention is preferably a mixed solvent of methyl isobutyl ketone and butyl acetate.

The solvent is contained at 5-10,000 parts by mass, preferably 5-5,000 parts by mass with respect to the total 100 parts by mass of the compound obtained by reacting component (A) with component (B), and if present, the fluorine-containing oil (C), but are not particularly limited thereto.

In a preferable embodiment, the composition of the present invention may be a composition containing a compound obtained by reacting pentaerythritol triacrylate or dipentaerythritol pentaacrylate as component (B2) in a solvent selected from methyl isobutyl ketone, butyl acetate, and methyl ethyl ketone and ethyl acetate.

In one embodiment, the composition of the present invention can be added to a matrix forming composition to provide a curable composition.

The curable composition contains the composition of the present invention at 0.01-20% by mass, preferably 0.01-10% by mass, more preferably, 0.1-10% by mass with respect to the total of the matrix forming composition and the composition of the present invention.

The curable composition of the present invention may contain a solvent. As the solvent, the fluorine-containing organic solvent, the fluorine-free organic solvent or the mixed solvent thereof described above for the composition of the present invention can be used.

These solvents may be used alone or may be used in combination of two or more.

In a preferable embodiment, the solvent is a fluorine containing organic solvent.

In another preferable embodiment, the solvent may be a mixed solvent of the fluorine-containing organic solvent and the fluorine-free organic solvent.

The solvent is contained at 0-19,900 parts by mass, preferably 0-10,000 parts by mass with respect to the total 100 parts by mass of the compound obtained by reacting component (A) with component (B), and if present, the fluorine-containing oil (C) and the matrix forming composition, but are not particularly limited thereto.

The curable composition of the present invention may contain other components, for example, a silicone oil, an active energy curing initiator, and the like in addition to the above component.

As the silicone oil and the active energy curing initiator, the silicone oil and the active energy curing initiator described for the composition of the present invention can be used.

The matrix forming composition is not particularly limited as long as it contains a polymerizable compound. Examples of the polymerizable compound include a compound having at least one carbon-carbon double bond, for example, a compound having an acryloyl group, a methacryloyl group, a vinyl group, an allyl group, a propenyl group, an isopropenyl group, a vinylether group, or the like, or a maleimide group, or an epoxy group, or the like, but are not particularly limited thereto.

The polymerizable compound is preferably a monofunctional and/or polyfunctional acrylate and methacrylate (hereinafter, acrylate and methacrylate also generally referred to as "(meth)acrylate"), a monofunctional and/or polyfunctional urethane (meth)acrylate, a monofunctional and/or polyfunctional epoxy (meth)acrylate.

Examples of the matrix forming composition include, but are not particularly limited to, a composition which is generally a hard coating agent or an antireflection agent, for example, a hard coating agent containing the polyfunctional (meth)acrylate or an antireflection agent containing a fluorine-containing (meth)acrylate. The hard coating agent is commercially available, for example, as Beam set 502H, 504H, 505A-6, 550B, 575CB, 577, 1402 (trade name) from Arakawa Chemical Industry Co., Ltd.; as EBECRYL40 (trade name) from Daicel Cytec company; and as HR300 series (trade name) from Yokohama Rubber Co., Ltd. The antireflection agent is commercially available, for example, as Optool AR-110 (trade name) from Daikin Industries, Ltd.

The composition and the curable composition of the present invention may further comprise an antioxidant, a thickener, a leveling agent, an antifoaming agent, an antistatic agent, an antifogging agent, an ultraviolet absorber, a pigment, a dye, an inorganic fine particle such as a silica and a hollow silica, an aluminum paste, a talc, a glass frit, a filler such as a metal powder, butylated hydroxy toluene (BHT) and a polymerization inhibitor such as phenothiazine (PTZ).

The composition, the surface treatment composition and the curable composition of the present invention can be used as an antifouling-coating agent or a waterproof-coating agent.

Next, the article of the present invention will be described.

The article of the present invention comprises a base material and a layer (i.e., surface treating layer) which is formed from the composition or the curable composition of the present invention (hereinafter, the composition or the curable composition of the present invention are generally referred to as a "surface treating agent") on the surface of the base material. This article can be produced, for example, as follows.

Firstly, the base material is provided. The base material usable in the present invention may be composed of any suitable material such as a glass, a resin (may be a natural or synthetic resin such as a common plastic material, preferably, a polycarbonate resin, a poly(meth)acrylate resin, a polyethylene terephthalate resin, a triacetyl cellulose resin, and may be in form of a plate, a film, or others), a metal (may be a simple substance of a metal such as aluminum, copper, or iron, or a complex such as alloy or the like), a ceramic, a semiconductor (silicon, germanium, or the like), a fiber (a fabric, a non-woven fabric, or the like), a fur, a leather, a wood, a pottery, a stone, an architectural member, a medical apparatus, a medical material or the like.

For example, when an article to be produced is an optical member, a material constituting the surface of the base material may be a material for an optical member, for example, a glass or a transparent plastic. Furthermore, the base material may have an insulating layer, an adhesive layer, a protecting layer, a decorated frame layer (I-CON), an atomizing layer, a hard coating layer, a polarizing film, a phase difference film, a liquid crystal display module, and the like, depending on its specific specification.

The shape of the base material is not specifically limited. The region of the surface of the base material on which the surface treating layer should be formed may be at least a part of the surface of the base material, and may be appropriately determined depending on use, the specific specification, and the like of the article to be produced.

Next, the film of the above surface treating agent of the present invention is formed on the surface of the base material, and the film is post-treated, as necessary, and thereby the surface treating layer is formed from the surface treating agent.

The formation of the film of the surface treating agent of the present invention can be performed by applying the above surface treating agent on the surface of the base material such that the surface treating agent coats the surface. The method of coating is not specifically limited. For example, a wet coating method or a dry coating method can be used.

Examples of the wet coating method include dip coating, spin coating, flow coating, spray coating, roll coating, gravure coating, micro-gravure coating, bar coating, die coating, screen printing and a similar method.

When the wet coating method is used, the surface treating agent of the present invention is diluted with a solvent, and then it is applied to the surface of the base material. As the solvent, the above-mentioned fluorine-containing organic solvent and fluorine-free organic solvent can be used. In view of stability of the surface treating agent of the present invention and volatile property of the solvent, the following solvents are preferably used: an aliphatic perfluorohydrocarbon having 5-12 carbon atoms (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon; a hydrofluoroether (HFE) (for example, an alkyl perfluoroalkyl ether such as perfluoropropyl methyl ether ($C_3F_7OCH_3$), perfluorobutyl methyl ether ($C_4F_9OCH_3$), perfluorobutyl ethyl ether ($C_4F_9OC_2H_5$) and perfluorohexyl methyl ether ($C_2F_5CF(OCH_3)C_3F_7$) (the perfluoroalkyl group and the alkyl group may be liner or branched)), a hydrochlorofluorocarbon (ASAHIKLIN AK-225 (trade name)); a cellosolve solvent such as methyl cellosolve, ethyl cellosolve, methyl cellosolve acetate, ethyl cellosolve acetate; an ester solvent such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, ethyl 2-hydroxyisobutyrate; a propylene glycol solvent such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether; a ketone solvent such as acetone, methyl ethyl ketone, methyl isobutyl ketone, 2-hexanone, cyclohexanone, methyl amino ketone, 2-heptanone; an alcohol solvent such as methanol, ethanol, propanol, isopropanol, butanol, diacetone alcohol; an aromatic hydrocarbon such as toluene, xylene, and the like. These solvents may be used alone or as a mixture of or more compound. Among them, hydrofluoroether, the glycol solvent, the ester solvent, the ketone solvent and the alcohol solvent are preferable, and perfluorobutyl methyl ether ($C_4F_9OCH_3$) and/or perfluorobutyl ethyl ether ($C_4F_9OC_2H_5$), propylene glycol monomethyl ether, ethyl acetate, butyl acetate, propylene glycol monomethyl ether acetate, methyl isobutyl ketone, isopropanol, butanol and diacetone alcohol are particularly preferable.

Next, the film is post-treated. This post-treatment is performed by irradiation of, for example, an active energy ray, for example, an electromagnetic wave of 350 nm or less, that is, an ultraviolet light, an electron beam, an X-ray, a γ-ray, etc., but are not limited thereto. By performing such post-treatment, curing of a curable moiety in the composition of the present invention (for example, the carbon-carbon double bond), and if present a curable moiety of the hard coating agent is initiated, so that a bond between these compounds or between these compounds and the base material is formed. Such post-treatment contributes to increasing of friction durability of the obtained surface treating layer.

As described above, the surface treating layer derived from the surface treating agent of the present invention is formed on the surface of the base material to produce the article of the present invention. The surface treating layer thus formed has high surface slip property (or lubricity, for example, wiping property of a fouling such as fingerprints and excellent tactile feeling in a finger) and high friction durability in addition to water-repellency, oil-repellency, and antifouling property.

Furthermore, the present invention further provides an optical material having the surface treating layer on the outermost layer.

Examples of the optical material include preferably a variety of optical materials in addition to the optical material for displays, or the like exemplified in below: for example, lens of glasses, or the like; displays such as a cathode ray tube (CRT; for example, TV, personal computer monitor), a liquid crystal display, a plasma display, an organic EL display, an inorganic thin-film EL dot matrix display, a rear projection display, a vacuum fluorescent display (VFD), a field emission display (FED; Field Emission Display), or a front surface protective plate, an antiscattering film, an antireflection plate, a polarizing plate, or an anti-glare plate of such displays, or that which have been subjected to antireflection treatment on their surface; a touch panel sheet of an instrument such as a mobile phone or a personal digital assistance; a disk surface of an optical disk such as a Blu-ray disk, a DVD disk, a CD-R or MO; an optical fiber, and the like.

The thickness of the surface treating layer is not specifically limited. For the optical member, the thickness of the surface treating layer is within the range of 0.1-30 μm, preferably 0.5-20 μm, in view of optical performance, friction durability and antifouling property.

Hereinbefore, the article produced by using the surface treating agent of the present invention is described in detail. It is noted that an application or a method for using the surface treating agent of the present invention, or a method for producing the article are not limited to the above exemplification.

EXAMPLE

Example 1

In 100 ml of three-necked glass flask equipped with a dropping funnel, a Dimroth condenser, and a thermometer, SUMIDUR (registered trademark) N3300 (manufactured by Sumitomo Bayer Urethane Co., Ltd., the content of the NCO group: 21.8%, 1.8 g) was dissolved in HCFC 225 (15.0 g), and dibutyltin dilaurate (manufactured by Wako Pure Chemical Industries, Ltd., 0.3 g) diluted with HCFC 225 to 1% was added. Then, a solution in which an alcohol having a perfluoropolyether of an average composition: $CF_3CF_2CF_2O(CF_2CF_2CF_2O)_{14}CF_2CF_2CH_2OH$ (3.0 g) was dissolved in HCFC 225 (3.0 g) was dropped into the mixture under nitrogen flowing with stirring at 40° C. and the mixture was stirred. Then, a solution in which dipentaerythritol pentaacrylate (5.3 g) was dissolved in HCFC 225 (5.3 g) was dropped into the mixture, and the mixture was stirred. After confirming that absorption of NCO in IR (Infrared Spectroscopy) was completely disappeared, dibutyl hydroxy toluene diluted with HCFC 225 to 1% (1.0 g) was added, and then the mixture was stirred, and diluted with HCFC 225 such that the concentration of the solid in the solution was 20% by mass.

Example 2

The composition of Example 2 was prepared similarly to Example 1 except that agents and the use amount are changed as shown in the following table.

TABLE 1

| | |
|---|---|
| SUMIDUR N3300 | 1.8 g |
| HCFC 225(for dissolving SUMIDUR) | 13.8 g |
| dibutyltin dilaurate (HCFC 225, 1% diluted solution) | 0.3 g |
| $CF_3CF_2CF_2O(CF_2CF_2CF_2O)_{14}CF_2CF_2CH_2OH$ | 3.0 g |
| HCFC 225 (for dissolving the above perfluoropolyether) | 3.0 g |
| dipentaerythritol pentaacrylate | 3.0 g |
| HCFC 225 (for dissolving the above acrylate) | 3.0 g |
| dibutyl hydroxy toluene (HCFC 225, 1% diluted solution) | 0.9 g |

Comparative Example 1

In 100 ml of three-necked glass flask equipped with a dropping funnel, a condenser, and a thermometer, SUMIDUR (registered trademark) N3300 (manufactured by Sumitomo Bayer Urethane Co., Ltd., the content of the NCO group: 21.8%, 1.8 g) was dissolved in HCFC 225 (10.5 g), and dibutyltin dilaurate (manufactured by Wako Pure Chemical Industries, Ltd., 0.2 g) diluted with HCFC 225 to 1% was added. Then, a solution in which an alcohol having a perfluoropolyether of an average composition: $CF_3CF_2CF_2O(CF_2CF_2CF_2O)_{14}CF_2CF_2CH_2OH$ (3.0 g) was dissolved in HCFC 225 (3.0 g) was dropped into the mixture under nitrogen flowing with stirring at 40° C. and the mixture was stirred. Then, 2-hydroxyethyl acrylate (1.2 g) was dropped into the mixture, and after the mixture was stirred, it was confirmed that absorption of NCO in IR was completely disappeared. Dibutyl hydroxy toluene (0.5 g) diluted with HCFC 225 to 1% was added.

Examination 1: Solubility Examination

Each of the compositions obtained in Examples 1-2 and Comparative Example 1 was added to methyl ethyl ketone (MEK), methyl isobutyl ketone (MIBK), ethyl acetate and butyl acetate such that the concentration of the solid was 20% by mass, and stirred at 25° C. for 60 minutes. The obtained solutions were observed, and solubility was determined based on the following criteria.

⊚—clear and colorless
○—dissolved, but slightly cloudy
X—producing precipitate

TABLE 2

| | Ketone solvent | | Esther solvent | |
|---|---|---|---|---|
| | MEK | MIBK | Ethyl acetate | Butyl acetate |
| Example 1 | ⊚ | ○ | ⊚ | ○ |
| Example 2 | ⊚ | ⊚ | ⊚ | ⊚ |
| Comparative Example 1 | X | X | X | X |

Examination 2: Function Examination

Formation of Surface Treating Layer

Each of the compositions (20% by mass) obtained in Examples 1-2 and Comparative Example 1 (0.5 g) was added to Irgacure 184 (0.5 g) and DPHA (9.9 g), and dissolved into a mixed solvent (29.5 g) of propylene glycol monomethylether: methyl isobutyl ketone=2:1 to obtain 25% by mass of a curable composition. The obtained curable composition was applied to a polycarbonate substrate (Stella, manufactured by Nippon Testpanel Co., Ltd) by using Bar Coater No. 20, and dried at 70° C. for 5 minutes. Then, 600 mJ/cm² of ultraviolet was irradiated to form the surface treatment layer.

Evaluation

Evaluation of Contact Angle

Static contact angles of water and n-hexadecane (water contact angle and n-hexadecane contact angle) were measured for 1 μL or 2 μL respectively by using a contact angle measuring instrument (manufactured by KYOWA INTERFACE SCIENCE Co., Ltd., "DropMaster"). The results are shown in Table 1 below.

TABLE 3

| | Contact angle (degree) | |
|---|---|---|
| | water | n-hexadecane |
| Example 1 | 107.6 | 64.1 |
| Example 2 | 108.9 | 65.6 |
| Comparative Example 1 | 107.1 | 63.4 |

Evaluation of Friction Durability

For the surface treating layer formed on the surface of the base material in Examples 1 and 2 and Comparative Example 1, friction durability was evaluated by an eraser friction durability evaluation. Specifically, the sample article on which the surface treating layer was formed was horizontally arranged, and then, an eraser (manufactured by Kokuyo Co., Ltd.; KESHI-70; flat dimension: 1 cm×1.6 cm) was contacted with the surface of the surface treating layer and a load of 500 gf was applied thereon. Then, the eraser was shuttled at a rate of 20 mm/second while applying the load. The static water contact angle (degree) was measured every 500 shuttles. The evaluation was stopped when the measured value of the contact angle decreased by 15 degrees or more from the initial contact angle. The number of shuttles until the evaluation was stopped was shown in the table.

TABLE 4

| | durability (times) |
|---|---|
| Example 1 | 9000 or more |
| Example 2 | 4000 |
| Comparative Example 1 | 2500 |

From the above results, the surface treating layer formed in Examples 1 and 2 has higher friction durability in comparison with the surface treating layer formed in Comparative Example 1.

INDUSTRIAL APPLICABILITY

The present invention is suitably applied for forming a surface treating layer on a surface of various base materials.

The present invention includes following embodiments:

Embodiment 1

A composition comprising a compound containing a carbon-carbon double bond obtained by reacting (A) a polyisocyanate which is a trimer of diisocyanate, with (B) a compound having an active hydrogen, wherein component (B) comprises:

(B1) a perfluoropolyether having an active hydrogen, and (B2) a monomer having an active hydrogen and at least two groups having a carbon-carbon double bond, the perfluoropolyether having an active hydrogen is at least one compound of any one of the following general formulae (B1-i) and (B1-ii):

Rf—PFPE$^1$-Z—X  (B1-i)

X—Z—PFPE$^2$-Z—X  (B1-ii)

wherein:
Rf is an alkyl group having 1-16 carbon atoms which may be substituted by one or more fluorine atoms;
PFPE$^1$ is a group of the formula:

—(OCF$_2$CF$_2$CF$_2$)$_b$— wherein b is an integer of 1-200;

—(OCF$_2$CF$_2$CF$_2$CF$_2$)$_a$—(OCF$_2$CF$_2$CF$_2$)$_b$— (OCF$_2$CF$_2$)$_c$—(OCF$_2$)$_d$— wherein a and b are each independently 0 or an integer of 1-30, and c and d are each independently an integer of 1-200, and the occurrence order of the respective repeating units in parentheses with the subscript a, b, c or d is not limited in the formula;
or —(OC$_2$F$_4$—R$^5$)$_i$— wherein R$^5$ is a group selected from OC$_2$F$_4$, OC$_3$F$_6$ and OC$_4$F$_8$; and
i is an integer of 2-100;
PFPE$^2$ is a group of the formula:

—(OCF$_2$CF$_2$CF$_2$)$_b$— wherein b is an integer of 1-200,
or

—(OC$_2$F$_4$—R$^5$)$_i$— wherein R$^5$ is a group selected from OC$_2$F$_4$, OC$_3$F$_6$ and OC$_4$F$_8$; and
i is an integer of 2-100;
Z is each independently a divalent organic group; and
X is an active hydrogen containing group.

Embodiment 2

The composition according to Embodiment 1 wherein component (A) is an isocyanurate type polyisocyanate.

Embodiment 3

The composition according to Embodiment 1 or 2 wherein component (B1) is at least one compound of any one of the following general formulae (B1-i') and (B1-ii'):

Rf—PFPE$^1$-R$^1$—CH$_2$OH  (B1-i')

HOCH$_2$—R$^1$—PFPE$^2$-R$^1$—CH$_2$OH  (B1-ii')

wherein:
Rf, PFPE$^1$ and PFPE$^2$ are as defined in Embodiment 1; and
R$^1$ is each independently a group of the following formula:

—(Y)$_f$—(CR$^3_2$)$_j$— wherein
Y is an oxygen atom or a divalent polar group,
R$^3$ is, each independently at each occurrence, a hydrogen atom or a fluorine atom,
f is an integer of 0-50,
j is an integer of 0-100,
the sum of f and j is at least one, and
the occurrence order of the respective repeating units in parentheses is not limited in the formula.

Embodiment 4

The composition according to Embodiment 3 wherein R$^1$ is each independently a group of the following formula:

—(Y)$_f$—(CF$_2$)$_g$—(CH$_2$)$_h$— wherein
Y is an oxygen atom or a divalent polar group,
f, g and h are each independently an integer of 0-50,
the sum of f, g and h is at least one, and
the occurrence order of the respective repeating units in parentheses is not limited in the formula.

Embodiment 5

The composition according to any one of Embodiments 1-4 wherein component (B1) is at least one compound of the general formula (B1-i).

Embodiment 6

The composition according to any one of Embodiments 1-5 wherein a number average molecular weight of the perfluoropolyether having an active hydrogen in component (B1) is 500-12,000.

Embodiment 7

The composition according to any one of Embodiments 1-6 wherein the group having the carbon-carbon double bond in component (B2) is a group of the formula:

—OC(O)—CR²=CH₂ wherein
R² is a hydrogen atom, a chlorine atom, a fluorine atom, or an alkyl group having 1-10 carbon atoms which may be substituted by a fluorine atom.

Embodiment 8

The composition according to any one of Embodiments 1-7 wherein the group having a carbon-carbon double bond in component (B2) is a (meth)acrylate group.

Embodiment 9

The composition according to any one of Embodiments 1-8 wherein component (B2) has at least 3 carbon-carbon double bonds.

Embodiment 10

The composition according to any one of Embodiments 1-9 wherein component (B2) is at least one compound selected from the group consisting of

HO—CH₂—C(CH₂—OC(O)—CR²=CH₂)₃;

HO—CH₂—C(CH₂—OC(O)—CR²=CH₂)₂—CH₂OCH₂—C(CH₂—OC(O)—CR²=CH₂)₃;

HO—CH(CH₂—OC(O)—CR²=CH₂)₂;

HO—Y¹$_p$—CH₂CH₂-Q(CH₂CH₂O—X$_p$—CO—CR²=CH₂)₂;

HO—Y²$_p$—CH₂—C(CH₂O—Y²$_p$—CO—CR²=CH₂)₃; or

HO—Y²$_p$—CH₂—C(CH₂—O—Y²$_p$—C(O)—CR²=CH₂)₂—CH₂OCH₂—C(CH₂—O—Y²$_p$—C(O)—CR²=CH₂)₃ wherein R² is a hydrogen atom, a chlorine atom, a fluorine atom or an alkyl group having 1-10 carbon atoms which may be substituted by a fluorine atom,
Q is a group of the formula:

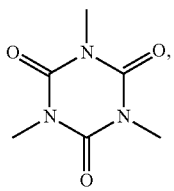

Y¹ is —CO—(CH₂)₅—O—;
Y² is each independently —CH₂CH₂O— or —CH₂CH(CH₃)O—;
p is each independently an integer of 0-2.

Embodiment 11

The composition according to any one of Embodiments 1-10 wherein component (B2) is at least one compound selected from the group consisting of pentaerythritol triacrylate, dipentaerythritol pentaacrylate, 2-hydroxy-3-methacrylpropylacrylate, 2-hydroxyethyl bis(2-acryloxyethyl) isocyanurate, caprolatone modified 2-hydroxyethyl bis(2-acryloxyethyl)isocyanurate, ethoxylated pentaerythritol triacrylate, propoxylated pentaerythritol triacrylate, ethoxylated dipentaerythritol pentaacrylate, propoxylated dipentaerythritol pentaacrylate, ethoxylated pentaerythritol trimethacrylate, propoxylated pentaerythritol trimethacrylate, ethoxylated dipentaerythritol pentaacrylate, and propoxylated dipentaerythritol pentaacrylate.

Embodiment 12

The composition according to any one of Embodiments 1-11 wherein component (B1) is Rf—(OCF₂CF₂CF₂)$_b$—Z—X wherein Rf, Z, X and b are as defined in Embodiment 1, and component (B2) is pentaerythritol triacrylate.

Embodiment 13

The composition according to any one of Embodiments 1-12 comprising at least one fluorine-containing oil of the following general formula (C):

Rf¹—PFPE-Rf²          (C)

wherein:
Rf¹ is an alkyl group having 1-16 carbon atoms which may be substituted by one or more fluorine atoms;
Rf² is a hydrogen atom, a fluorine atom, or an alkyl group having 1-16 carbon atoms which may be substituted by one or more fluorine atoms; and
PFPE is a group of the general formula:

—(OC₄F₈)$_{a'}$—(OC₃F₆)$_{b'}$—(OC₂F₄)$_{c'}$—(OCF₂)$_{d'}$— wherein a', b', c' and d' are each independently an integer of 0-200, the sum of a', b', c' and d' is at least one, and the occurrence order of the respective repeating units in parentheses with the subscript a', b', c' or d' is not limited in the formula.

Embodiment 14

A surface treatment composition comprising one or more compositions according to any one of Embodiments 1-13.

Embodiment 15

The surface treatment composition according to Embodiment 14 comprising a solvent of 5-10,000 parts by mass with respect to the total 100 parts by mass of the composition according to any one of Embodiments 1-13.

Embodiment 16

The surface treatment composition according to Embodiment 15 wherein the solvent is a fluorine-containing organic solvent.

Embodiment 17

The surface treatment composition according to Embodiment 15 wherein the solvent is a mixed solvent of a fluorine-free organic solvent and a fluorine-containing organic solvent.

Embodiment 18

The surface treatment composition according to Embodiment 15 wherein the solvent is one or a mixture of two or more selected from methyl isobutyl ketone, methyl ethyl ketone, butyl acetate and ethyl acetate.

Embodiment 19

The surface treatment composition according to any one of Embodiments 14-18 comprising an active energy curing initiator.

Embodiment 20

A curable composition comprising
one or more compositions according to any one of Embodiments 1-13; and
a matrix forming composition.

Embodiment 21

The curable composition according to Embodiment 20 comprising a solvent of 0-19,900 parts by mass with respect to the total 100 parts by mass of the composition according to any one of Embodiments 1-13 and the matrix forming composition.

Embodiment 22

The curable composition according to Embodiment 21 wherein the solvent is a fluorine-free organic solvent.

Embodiment 23

The curable composition according to Embodiment 21 wherein the solvent is a mixed solvent of a fluorine-free organic solvent and a fluorine-containing organic solvent.

Embodiment 24

The curable composition according to Embodiment 21 wherein the solvent is one or a mixture of two or more selected from methyl isobutyl ketone, methyl ethyl ketone, butyl acetate and ethyl acetate.

Embodiment 25

The curable composition according to any one of Embodiments 20-24 comprising an active energy curing initiator.

Embodiment 26

The curable composition according to any one of Embodiments 20-25 comprising the composition according to any one of Embodiments 1-13 of 0.01-10% by mass with respect to the total of the matrix forming composition and the composition according to any one of Embodiments 1-13.

Embodiment 27

The surface treatment composition according to any one of Embodiments 14-19 or the curable composition according to any one of Embodiments 20-26 which is an antifouling-coating agent or a waterproof-coating agent.

Embodiment 28

An article comprising a base material and a layer which is formed on a surface of the base material from the surface treatment composition according to any one of Embodiments 14-19 or the curable composition according to any one of Embodiments 20-27.

Embodiment 29

The article according to Embodiment 28 which is an optical member.

The invention claimed is:

1. A surface treatment composition comprising a compound containing a carbon-carbon double bond obtained by reacting
    (A) a polyisocyanate which is a trimer of diisocyanate, with
    (B) a compound having an active hydrogen, and a solvent
    wherein
    component (B) comprises:
    (B1) a perfluoropolyether having an active hydrogen, and
    (B2) a monomer having an active hydrogen and at least two groups having a carbon-carbon double bond,
    the perfluoropolyether having an active hydrogen is at least one compound of any one of the following general formulae (B1-i) and (B1-ii):

$$Rf—PFPE^1-Z—X \quad \text{(B1-i)}$$

$$X—Z—PFPE^2-Z—X \quad \text{(B1-ii)}$$

wherein:
    Rf is an alkyl group having 1-16 carbon atoms which may be substituted by one or more fluorine atoms;
    $PFPE^1$ is a group of the formula:

$$—(OCF_2CF_2CF_2)_b—$$

wherein b is an integer of 1-200;

$$—(OCF_2CF_2CF_2CF_2)_a—(OCF_2CF_2CF_2)_b—(OCF_2CF_2)_c—(OCF_2)_d—$$

wherein a and b are each independently 0 or an integer of 1-30, and c and d are each independently an integer of 1-200, and the occurrence order of the respective repeating units in parentheses with the subscript a, b, c or d is not limited in the formula;
    or $$—(OC_2F_4—R^5)_i—$$

wherein $R^5$ is a group selected from $OC_2F_4$, $OC_3F_6$ and $OC_4F_8$; and
    i is an integer of 2-100;
    $PFPE^2$ is a group of the formula:

$$—(OCF_2CF_2CF_2)_b—$$

wherein b is an integer of 1-200,
    or $$—(OC_2F_4—R^5)_i—$$

wherein $R^5$ is a group selected from $OC_2F_4$, $OC_3F_6$ and $OC_4F_8$; and
    i is an integer of 2-100;
    Z is each independently a divalent organic group; and
    X is an active hydrogen containing group,
    the solvent is 5-10,000 parts by mass with respect to the total 100 parts by mass of the composition, and
    the solvent is a fluorine-containing organic solvent, or a mixed solvent of a fluorine-free organic solvent and a fluorine-containing organic solvent.

2. The surface treatment composition according to claim 1 wherein component (A) is an isocyanurate type polyisocyanate.

3. The surface treatment composition according to claim 1 wherein component (B1) is at least one compound of any one of the following general formulae (B1-i') and (B1-ii'):

Rf—PFPE$^1$-R$^1$—CH$_2$OH (B1-i')

HOCH$_2$—R$^1$—PFPE$^2$-R$^1$—CH$_2$OH (B1-ii')

wherein:
Rf, PFPE$^1$ and PFPE$^2$ are as defined in claim 1; and
R$^1$ is each independently a group of the following formula:

—(Y)$_f$—(CR$^3{}_2$)$_j$— wherein
Y is an oxygen atom or a divalent polar group,
R$^3$ is, each independently at each occurrence, a hydrogen atom or a fluorine atom,
f is an integer of 0-50,
j is an integer of 0-100,
the sum of f and j is at least one, and
the occurrence order of the respective repeating units in parentheses is not limited in the formula.

4. The surface treatment composition according to claim 3 wherein R$^1$ is each independently a group of the following formula:

—(Y)$_f$—(CF$_2$)$_g$—(CH$_2$)$_h$— wherein
Y is an oxygen atom or a divalent polar group,
f, g and h are each independently an integer of 0-50,
the sum of f, g and h is at least one, and
the occurrence order of the respective repeating units in parentheses is not limited in the formula.

5. The surface treatment composition according to claim 1 wherein component (B1) is at least one compound of the general formula (B1-i).

6. The surface treatment composition according to claim 1 wherein a number average molecular weight of the perfluoropolyether having an active hydrogen in component (B1) is 500-12,000.

7. The surface treatment composition according to claim 1 wherein the group having the carbon-carbon double bond in component (B2) is a group of the formula:

—OC(O)—CR$^2$=CH$_2$ wherein
R$^2$ is a hydrogen atom, a chlorine atom, a fluorine atom, or an alkyl group having 1-10 carbon atoms which may be substituted by a fluorine atom.

8. The surface treatment composition according to claim 1 wherein the group having a carbon-carbon double bond in component (B2) is a (meth)acrylate group.

9. The surface treatment composition according to claim 1 wherein component (B2) has at least 3 carbon-carbon double bonds.

10. The surface treatment composition according to claim 1 wherein component (B2) is at least one compound selected from the group consisting of

HO—CH$_2$—C(CH$_2$—OC(O)—CR$^2$=CH$_2$)$_3$;

HO—CH$_2$—C(CH$_2$—OC(O)—CR$^2$=CH$_2$)$_2$—CH$_2$OCH$_2$—C(CH$_2$—OC(O)—CR$^2$=CH$_2$)$_3$;

HO—CH(CH$_2$—OC(O)—CR$^2$=CH$_2$)$_2$;

HO—Y$^1{}_p$—CH$_2$CH$_2$-Q(CH$_2$CH$_2$O—X$_p$—CO—CR$^2$=CH$_2$)$_2$;

HO—Y$^2{}_p$—CH$_2$—C(CH$_2$O—Y$^2{}_p$—CO—CR$^2$=CH$_2$)$_3$; or

HO—Y$^2{}_p$—CH$_2$—C(CH$_2$—O—Y$^2{}_p$—C(O)—CR$^2$=CH$_2$)$_2$—CH$_2$OCH$_2$—C(CH$_2$—O—Y$^2{}_p$—C(O)—CR$^2$=CH$_2$)$_3$ wherein R$^2$ is a hydrogen atom, a chlorine atom, a fluorine atom or an alkyl group having 1-10 carbon atoms which may be substituted by a fluorine atom,
Q is a group of the formula:

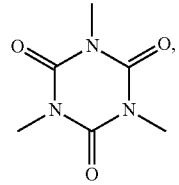

Y$^1$ is —CO—(CH$_2$)$_5$—O—;
Y$^2$ is each independently —CH$_2$CH$_2$O— or —CH$_2$CH(CH$_3$)O—;
p is each independently an integer of 0-2.

11. The surface treatment composition according to claim 10 wherein component (B2) is at least one compound selected from the group consisting of pentaerythritol triacrylate, dipentaerythritol pentaacrylate, 2-hydroxy-3-methacrylpropylacrylate, 2-hydroxyethyl bis(2-acryloxyethyl) isocyanurate, caprolatone modified 2-hydroxyethyl bis(2-acryloxyethyl)isocyanurate, ethoxylated pentaerythritol triacrylate, propoxylated pentaerythritol triacrylate, ethoxylated dipentaerythritol pentaacrylate, propoxylated dipentaerythritol pentaacrylate, ethoxylated pentaerythritol trimethacrylate, propoxylated pentaerythritol trimethacrylate, ethoxylated dipentaerythritol pentaacrylate, and propoxylated dipentaerythritol pentaacrylate.

12. The surface treatment composition according to claim 1 wherein component (B1) is Rf—(OCF$_2$CF$_2$CF$_2$)$_b$—Z—X wherein Rf, Z, X and b are as defined in claim 1, and component (B2) is pentaerythritol triacrylate.

13. The surface treatment composition according to claim 1 comprising at least one fluorine-containing oil of the following general formula (C):

Rf$^1$—PFPE-Rf$^2$ (C)

wherein:
Rf$^1$ is an alkyl group having 1-16 carbon atoms which may be substituted by one or more fluorine atoms;
Rf$^2$ is a hydrogen atom, a fluorine atom, or an alkyl group having 1-16 carbon atoms which may be substituted by one or more fluorine atoms; and
PFPE is a group of the general formula:

—(OC$_4$F$_8$)$_{a'}$—(OC$_3$F$_6$)$_{b'}$—(OC$_2$F$_4$)$_{c'}$—(OCF$_2$)$_{d'}$— wherein a', b', c' and d' are each independently an integer of 0-200, the sum of a', b', c' and d' is at least one, and the occurrence order of the respective repeating units in parentheses with the subscript a', b', c' or d' is not limited in the formula.

14. The surface treatment composition according to claim 1 comprising an active energy curing initiator.

15. A curable composition comprising
the surface treatment composition according to claim 1; and
a matrix forming composition.

16. The curable composition according to claim 15 comprising a solvent of 0-19,900 parts by mass with respect to the total 100 parts by mass of the surface treatment composition according to claim 1 and the matrix forming composition.

17. The curable composition according to claim 16 wherein the solvent is a fluorine-free organic solvent.

18. The curable composition according to claim 16 wherein the solvent is a mixed solvent of a fluorine-free organic solvent and a fluorine-containing organic solvent.

19. The curable composition according to claim 16 wherein the solvent is one or a mixture of two or more selected from methyl isobutyl ketone, methyl ethyl ketone, butyl acetate and ethyl acetate.

20. The curable composition according to claim 15 comprising an active energy curing initiator.

21. The curable composition according to claim 15 comprising the composition according to claim 1 of 0.01-10% by mass with respect to the total of the matrix forming composition and the surface treatment composition according to claim 1.

22. The curable composition according to claim 15 which is an antifouling-coating agent or a waterproof-coating agent.

23. The surface treatment composition according to claim 1 which is an antifouling-coating agent or a waterproof-coating agent.

* * * * *